US012615481B2

(12) United States Patent
Zhao et al.

(10) Patent No.: US 12,615,481 B2
(45) Date of Patent: Apr. 28, 2026

(54) MEMS MICROPHONE

(71) Applicant: AAC ACOUSTIC TECHNOLOGIES (SHENZHEN) CO., LTD., Shenzhen (CN)

(72) Inventors: Zhuanzhuan Zhao, Shenzhen (CN); Linlin Wang, Shenzhen (CN); Kaijie Wang, Shenzhen (CN); Rui Zhang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 288 days.

(21) Appl. No.: 18/454,042

(22) Filed: Aug. 22, 2023

(65) Prior Publication Data

US 2024/0155296 A1 May 9, 2024

Related U.S. Application Data

(63) Continuation of application No. PCT/CN2022/140833, filed on Dec. 21, 2022.

(30) Foreign Application Priority Data

Nov. 8, 2022 (CN) ......................... 202222975865.2

(51) Int. Cl.
*H04R 19/04* (2006.01)
*H04R 7/04* (2006.01)
*H04R 7/18* (2006.01)

(52) U.S. Cl.
CPC ............... *H04R 19/04* (2013.01); *H04R 7/04* (2013.01); *H04R 7/18* (2013.01); *H04R 2201/003* (2013.01)

(58) Field of Classification Search
None
See application file for complete search history.

(56) References Cited

U.S. PATENT DOCUMENTS

2020/0336842 A1 * 10/2020 Kwon .................. B81B 7/0029

FOREIGN PATENT DOCUMENTS

| | | | | |
|---|---|---|---|---|
| CN | 103686570 A | * | 3/2014 | ........... H04R 19/005 |
| CN | 206061136 U | * | 3/2017 | ........... H04R 19/005 |
| CN | 108810776 A | * | 11/2018 | ............. H04R 19/04 |
| CN | 217363312 U | * | 9/2022 | ........... B81B 3/0072 |

* cited by examiner

*Primary Examiner* — Quynh H Nguyen
(74) *Attorney, Agent, or Firm* — Wiersch Law Group

(57) ABSTRACT

A MEMS microphone includes a substrate, a supporting plate, a capacitor system, a first pad, and a first electrode. The substrate defines a back cavity, the supporting plate is disposed at one side of the substrate and defines an accommodation cavity, and the capacitor system is disposed at the supporting plate. The capacitor system includes a back plate, a fixing component, and a vibrating diaphragm. The vibrating diaphragm is fixed to one side of the fixing component distal from the back plate. The vibrating diaphragm forms a cantilever structure fixing at the middle, and the first electrode is only connected to a central region of the vibrating diaphragm, the first electrode may not interfere with deformation of an edge region of the vibrating diaphragm, thereby improving sensitivity of the MEMS microphone through fully releasing residual stress of the vibrating diaphragm.

7 Claims, 4 Drawing Sheets

MEMS MICROPHONE

TECHNICAL FIELD

The present disclosure relates to a technical field of microphones, and in particular to a micro-electro-mechanical system (MEMS) microphone.

BACKGROUND

A condenser micro-electro-mechanical system (MEMS) microphone chip is mainly composed of a capacitor part and a base part, and a chip structure mainly includes a base structure having a back cavity, a vibrating diaphragm, and a fixed back plate structure. The vibrating diaphragm and the fixed back plate structure are located on a base, and the vibrating diaphragm and the fixed back plate structure form a capacitor system. When a sound pressure acts on the vibrating diaphragm, there is a pressure difference between a first side of the vibrating diaphragm facing a back plate and a second of the vibrating diaphragm facing away from the back plate, thereby causing changes in capacitance between the vibrating diaphragm and the back plate, and further achieving conversion from a sound signal to an electric signal.

There are multiple fixing manners for a vibrating diaphragm in a microphone, such as a fully fixing structure represented by Infineon Technologies, a cantilever structure, by fixing at one point of an edge, represented by Lou's, a partial fixing structure represented by AAC. Vibrating diaphragms of such structures are connected to an application specific integrated circuit (ASIC) through a certain extension part serving as leading-out electrodes. However, for a vibrating diaphragm having the cantilever structure fixing at the middle, if the electrodes are led out in a conventional manner, a purpose of improving sensitivity through fully releasing residual stress of the vibrating diaphragm proposed in an original design of the vibrating diaphragm having the cantilever structure fixing at the middle is lost.

Therefore, it is necessary to provide an electrode leading out method.

SUMMARY

The present disclosure aims to provide a micro-electro-mechanical system (MEMS) to solve technical problems that an electrode leading out method in the prior reduces sensitivity of microphones.

Technical solutions of the present disclosure are as following.

The present disclosure provides a MEMS microphone, including a substrate, a supporting plate, a capacitor system, a first pad, and a first electrode. The substrate defines a back cavity, the supporting plate is disposed at one side of the substrate and defines an accommodation cavity, and the capacitor system is disposed at the supporting plate. The capacitor system includes a back plate, a fixing component, and a vibrating diaphragm. The back plate is fixed to the supporting plate, the fixing component is fixed to one side of the back plate close to the substrate, the vibrating diaphragm is fixed to one side of the fixing component distal from the back plate and is accommodated in the accommodation cavity. The fixing component is located at a central region of the vibrating diaphragm, and the vibrating diaphragm is disposed opposite to the back plate. The first pad is fixed to one side of the supporting plate distal from the substrate, the first electrode is fixedly connected to the central region of the vibrating diaphragm and is electrically connected to the first pad, and the first electrode is only connected to the central region of the vibrating diaphragm.

Furthermore, the vibrating diaphragm defines a first notch extending from an edge of the vibrating diaphragm to the central region of the vibrating diaphragm, the first notch includes a bottom wall and two side walls, the bottom wall is disposed opposite to an opening of the notch, and the two side walls are respectively connected to two ends of the bottom wall. The first electrode is fixedly connected to the bottom wall, and a gap is defined between the first electrode and the bottom wall.

Furthermore, one end of the first electrode distal from the bottom wall is flush with an edge of the vibrating diaphragm.

Furthermore, the MEMS microphone further includes a conductive component, the conductive component penetrates through the back plate, and two ends of the conductive component are respectively and fixedly connected to the first electrode and the first pad. The conductive component is connected to one end of the first electrode distal from the bottom wall, and the first electrode is electrically connected to the first pad through the conductive component.

Furthermore, the MEMS microphone further includes an abutting component, a first end of the abutting component is fixed to the substrate, and a second end of the abutting component abuts against the first electrode. The abutting component is located between the two side walls of the first notch.

Furthermore, the MEMS microphone further includes a first supporting ring, the first supporting ring is embedded and fixed in the accommodation cavity, and two sides of the first supporting ring respectively abut against the vibrating diaphragm and the substrate. The first supporting ring defines a second notch, a projection of the first notch projected on the first supporting ring along a thickness direction of the vibrating diaphragm coincides with the second notch, and the abutting component is located in the second notch.

Furthermore, the MEMS microphone further includes a second supporting ring, the second supporting ring is embedded and fixed in the accommodation cavity, the second supporting ring is located between the vibrating diaphragm and the back plate, and the conductive component penetrates through the second supporting ring.

Furthermore, a thickness of the second supporting ring is equal to a thickness of the fixing component.

Furthermore, one side of the back plate distal from the substrate protrudes from a surface of the one side of the supporting plate distal from the substrate. The first pad includes a main body part, a bent part, and a connecting part. The main body part is fixed to the supporting plate, the bent part is connected to the main body part, and the connecting part is connected to one end of the bent part distal from the main body part. The conductive component penetrates through the connecting part and is fixed to the connecting part.

Furthermore, the MEMS microphone further includes a second pad and a second electrode, the second pad is fixed to the supporting plate, two ends of the second electrode are respectively and fixedly connected to the back plate and the second pad, and the first pad is spaced apart with the second pad.

Beneficial effects of the present disclosure are as following. Two sides of the fixing component are respectively and fixedly connected to the back plate and the vibrating diaphragm, and the fixing component is located at the central region of the vibrating diaphragm, so that the vibrating diaphragm forms a cantilever structure fixing at the middle. However, since the first electrode is only connected to the central region of the vibrating diaphragm, the first electrode may not interfere with deformation of an edge region of the vibrating diaphragm, thereby improving sensitivity of the MEMS microphone through fully releasing residual stress of the vibrating diaphragm.

DETAILED DESCRIPTION

Figure 1:
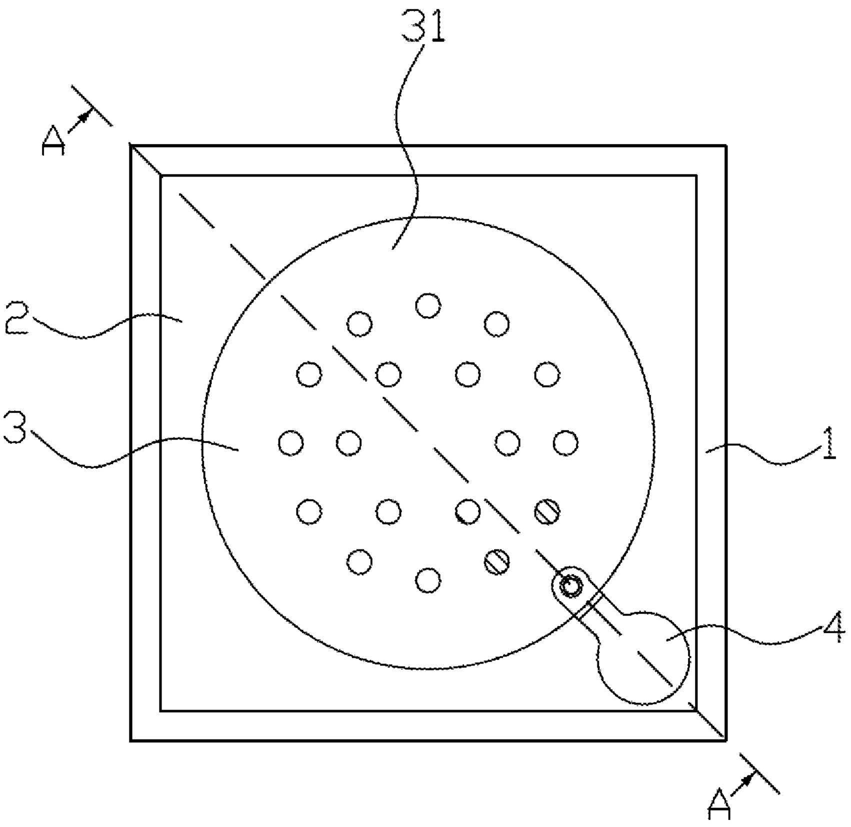
FIG. 1 is a schematic diagram of a top view of a MEMS microphone according to one embodiment of the present disclosure.

The present disclosure is further described below with reference to accompanying drawings and embodiments.

Please refer to FIGS. 1-4, the present disclosure provides a MEMS microphone, including a substrate 1, a supporting plate 2, a capacitor system 3, a first pad 4, and a first electrode 5. The substrate 1 defines a back cavity 11, the supporting plate 2 is disposed at one side of the substrate 1 and defines an accommodation cavity 21, and the capacitor system 3 is disposed at the supporting plate 2. The capacitor system 3 includes a back plate 31, a fixing component 32, and a vibrating diaphragm 33. The back plate 31 is fixed to the supporting plate 2, the fixing component 32 is fixed to one side of the back plate 31 close to the substrate 1, the vibrating diaphragm 33 is fixed to one side of the fixing component 32 distal from the back plate 31 and is accommodated in the accommodation cavity 21. The fixing component 32 is located at a central region of the vibrating diaphragm 33, and the vibrating diaphragm 33 is disposed opposite to the back plate 31. The first pad 4 is fixed to one side of the supporting plate 2 distal from the substrate 1, the first electrode 5 is fixedly connected to the central region of the vibrating diaphragm 33 and is electrically connected to the first pad 4, and the first electrode 5 is only connected to the central region of the vibrating diaphragm 33.

It should be understood that the first electrode 5 is a leading-out electrode corresponding to the vibrating diaphragm 33, two sides of the fixing component 32 are respectively and fixedly connected to the back plate 31 and the vibrating diaphragm 33, and the fixing component 32 is located at the central region of the vibrating diaphragm 33, so that the vibrating diaphragm 33 forms a cantilever structure fixing at the middle. However, since the first electrode 5 is only connected to the central region of the vibrating diaphragm 33, the first electrode 5 may not interfere with deformation of an edge region of the vibrating diaphragm 33, thereby improving sensitivity of the MEMS microphone through fully releasing residual stress of the vibrating diaphragm 33.

Figure 2:
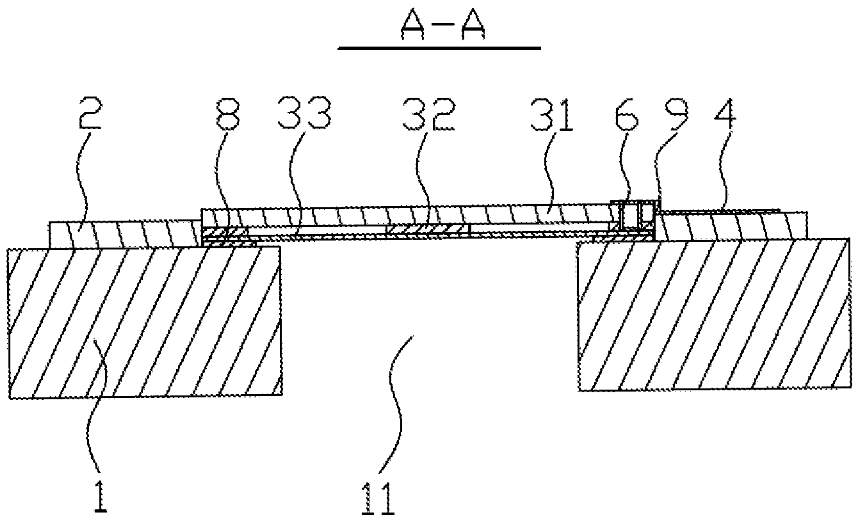
FIG. 2 is a schematic diagram of a cross-sectional view taken along the line A-A shown in FIG. 1.
Figure 3:
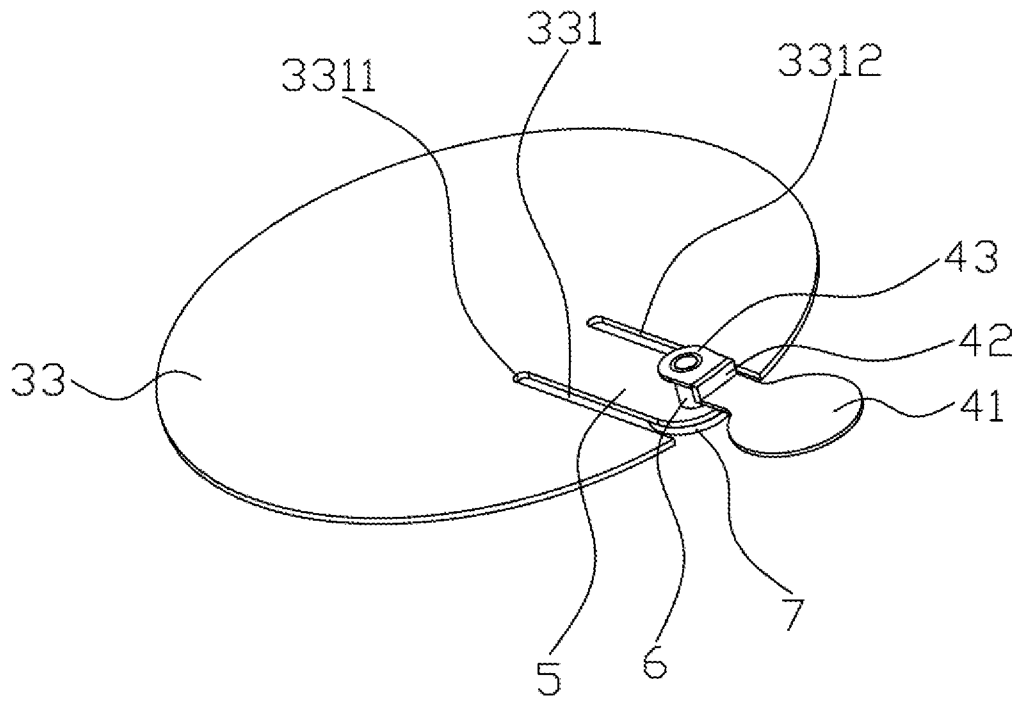
FIG. 3 is an assembly schematic diagram of a vibrating diaphragm, a first electrode, and a first pad of the MEMS microphone according to one embodiment of the present disclosure.
Figure 4:
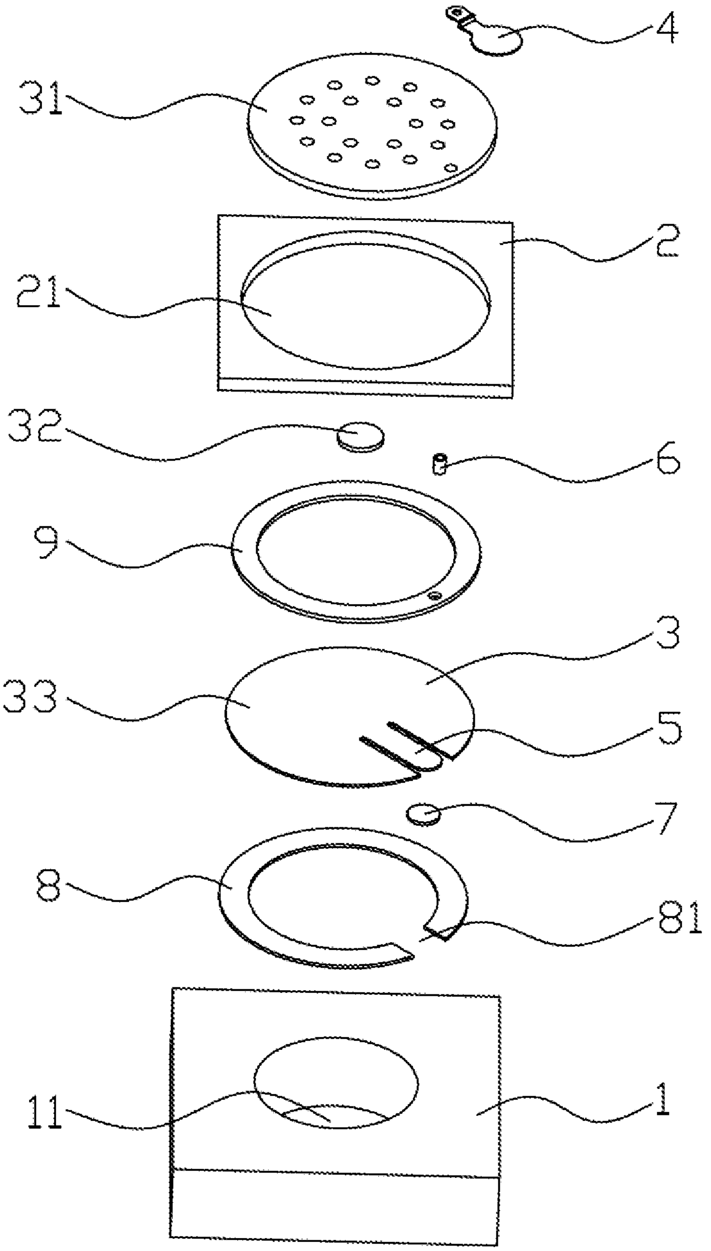
FIG. 4 is an exploded schematic diagram of the MEMS microphone according to one embodiment of the present disclosure.

Please refer to FIGS. 2-4, in some embodiments, the fixing component 32 may be a fixing plate, and the fixing component 32 is moderate in size, which not only ensures sufficient connection strength between the vibrating diaphragm 33 and the back plate 31, but also enables the vibrating diaphragm 33 to maintain sufficient strength of vibration and deformation. Each of the substrate 1 and the supporting plate 2 may be a rectangular plate, a longitudinal cross-sectional area of the back cavity 11 is smaller than a longitudinal cross-sectional area of the accommodation cavity 21, the capacitor system 3 is accommodated in the accommodation cavity 21, that is, the back plate 31, the fixing component 32, and the vibrating diaphragm 33 are all located in the accommodation cavity 21. The accommodation cavity 21 is communicated with the back cavity 11, the back plate 31 is embedded and fixed in the accommodation cavity 21, a plurality of sound holes are defined on a plate surface of the back plate 31, the vibrating diaphragm 33 directly faces the back plate 31. The vibrating diaphragm 33, a cavity wall of the accommodation cavity 21, and the substrate 1 jointly enclose to form a first oscillation sound cavity. The vibrating diaphragm 33, the cavity wall of the accommodation cavity 21, and the back plate 31 jointly enclose to form a second oscillation sound cavity. When a sound pressure penetrates through the plurality of the sound holes of the back plate 31 and acts on the vibrating diaphragm 33, there is a pressure difference between the first oscillation sound cavity and the second oscillation sound cavity, so that the vibrating diaphragm 33 moves in a direction close to the back plate 31 or distal from the back plate 31, thereby causing changes in capacitance between the vibrating diaphragm 33 and the back plate 31, and further achieving conversion from a sound signal to an electric signal.

Please refer to FIGS. 2-4, in one embodiment, the vibrating diaphragm 33 defines a first notch 331 extending from an edge of the vibrating diaphragm 33 to the central region of the vibrating diaphragm 33, the first notch 331 includes a bottom wall 3311 and two side walls 3312, the bottom wall 3311 is disposed opposite to an opening of the notch 331, and the two side walls 3312 are respectively connected to two ends of the bottom wall 3311. The first electrode 5 is fixedly connected to the bottom wall 3311, and a gap is defined between the first electrode 5 and the bottom wall 3312. Specifically, there is a certain distance between the bottom wall 3311 of the first notch 331 and the fixing component 32, for ensuring connection strength between the fixing component 32 and the vibrating diaphragm 33. The first notch 331 is moderate in size, and when the first notch 331 is too large in the size, an area of the vibrating diaphragm 33 is small, which is not beneficial to generate the pressure difference between the first oscillation sound cavity and the second oscillation sound cavity; when the first notch 331 is too small in size, it is not beneficial to fix the first electrode 5 on the vibrating diaphragm 33. A gap is defined between the first electrode 5 and the side walls 3312, so that the first electrode 5 may not interfere with the deformation of the edge region of the vibrating diaphragm 33, thereby improving the sensitivity of the MEMS microphone through fully releasing the residual stress of the vibrating diaphragm 33. As an improvement, one end of the first electrode 5 distal from the bottom wall 3311 is flush with an edge of the vibrating diaphragm 33, which is beneficial to dispose the first electrode 5 on the vibrating diaphragm 33. According to actual needs, the first electrode 5 may be a rectangular plate, and the first notch 311 may correspondingly be a rectangular notch.

As shown in FIGS. 2-4, in one embodiment, the MEMS microphone further includes a conductive component 6, the conductive component 6 penetrates through the back plate 31, and two ends of the conductive component 6 are respectively and fixedly connected to the first electrode 5 and the first pad 4. The conductive component 6 is connected to one end of the first electrode 5 distal from the bottom wall 3311, and the first electrode 5 is electrically connected to the first pad 4 through the conductive component 6. Specifically, the conductive component 6 may be a cylinder, the conductive component is hollowed out to reduce weight of the conductive component 6, the conductive component 6 is configured to electrically connect the first electrode 5 and the first pad 4.

As shown in FIGS. 2-4, as an improvement, the MEMS microphone further includes an abutting component 7, a first end of the abutting component 7 is fixed to the substrate 1, and a second end of the abutting component 7 abuts against the first electrode 5. The abutting component 7 is located between the two side walls 3312 of the first notch 331, the abutting component 7 and the conductive component 6 jointly clamp and fix the first electrode 5, so that the first electrode 5 does not shake up and down when the vibrating diaphragm 33 vibrates, thereby preventing the first electrode 5 from being broken due to shaking. The first abutting component 7 may be an insulator, and the first electrode 5 is placed for being in conduction with the substrate 1. According to actual needs, the abutting component 7 may be a circular plate, and a longitudinal cross-sectional area of abutting component 7 is smaller than a plate surface area of the first electrode 5.

Please refer to FIGS. 2-4, in one embodiment, the MEMS microphone further includes a first supporting ring 8, the first supporting ring 8 is embedded and fixed in the accommodation cavity 21, and two sides of the first supporting ring 8 respectively abut against the vibrating diaphragm 33 and the substrate 1, so that the first supporting ring 8 is capable of supporting the vibrating diaphragm 33, and meanwhile, the first supporting ring 8 is beneficial for forming the first oscillation sound cavity. The first supporting ring 8 defines a second notch 81, a projection of the first notch 331 projected on the first supporting ring 8 along a thickness direction of the vibrating diaphragm 33 coincides with the second notch 81, and the abutting component is located in the second notch, so that the first electrode 5 may not be in contact with the first supporting ring 8 and is beneficial to provide a space for the abutting component 7, thereby locating the abutting component 7 in the second notch 81, the supporting ring 8 is ensured to be horizontally disposed, so that the vibrating diaphragm 33 is horizontally disposed. According to actual needs, the first supporting ring 8 is a circular ring, and the circular ring is an insulator, so as to further prevent the first electrode 5 frog being in conduction with the substrate 1.

Please refer to FIGS. 2-4, furthermore, the MEMS microphone further includes a second supporting ring 9, the second supporting ring 9 is embedded and fixed in the accommodation cavity 21, the second supporting ring 9 is located between the vibrating diaphragm 33 and the back plate 31, and the conductive component 6 penetrates through the second supporting ring 9. Specifically, the second supporting ring 9 may supporting the back plate 31, the second supporting ring 9 is an insulator, so as to prevent the back plate 31 from being in conduction with the first electrode 5, and meanwhile, the second supporting ring is beneficial for forming the second sound cavity. Since the conductive component 6 penetrates through the second supporting ring 9, the second supporting ring 9 is capable of playing a positioning role on the conductive component 6, so as to rapidly position the conductive component 6 and the first electrode 5 during an assembly process. As an improvement, a thickness of the second supporting ring 9 is equal to a thickness of the fixing component 32, so as to ensure that distances from each portion of the vibrating diaphragm 33 to the back plate 31 are equal when the vibrating diaphragm 33 is stationary. In other embodiments, the thickness of the second supporting ring 9 is equal to the thickness of the fixing component 32, at this time, the first supporting ring 9 may be fixed to both the back plate 31 and the cavity wall of the accommodation cavity 31.

Please refer to FIGS. 2-4, in one embodiment, one side of the back plate 31 distal from the substrate 1 protrudes from a surface of the one side of the supporting plate 2 distal from the substrate 1. The first pad 4 includes a main body part 41, a bent part 42, and a connecting part 43. The main body part 41 is fixed to the supporting plate 2, the bent part 42 is connected to the main body part 41, and the connecting part 43 is connected to one end of the bent part 42 distal from the main body part 41. The conductive component 6 penetrates through the connecting part 43 and is fixed to the connecting part 6. Specifically, the main body part 41 may be a circular plate, the bent part 42 and the connecting part 43 may be rectangular plates, and an area of the main body part 41 is larger than an area of the bent part 42 and the connecting part 43, which is beneficial for connecting the first pad 4 and application specific integrated circuit (ASIC). The bent part 42 is vertically fixed to a plate surface of the main body part 41 and a plate surface of the connecting part 43, that is, the connecting part 43 and the main body part 41 are dispose in parallel, which is beneficial for directly fitting the first pad 4 on the supporting plate 2 and the back plate 31.

In one embodiment, the MEMS microphone further includes a second pad and a second electrode, the second pad is fixed to the supporting plate 2, two ends of the second electrode are respectively and fixedly connected to the back plate 31 and the second pad, and the first pad 4 is spaced apart with the second pad, which is beneficial for non conduction between the first pad 4 and the second pad.

Above-mentioned embodiments are merely embodiments of the present disclosure, and it should be noted that, for a person skilled in the art of the present disclosure, improvements may be made without departing from the concept of the present disclosure, but these are all within the scope of protection of the present disclosure.

What is claimed is:

1. A micro-electro-mechanical system (MEMS) microphone, comprising:
- a substrate;
- a supporting plate;
- a capacitor system;
- a first pad;
- a first electrode; and
- a conductive component;
- wherein the substrate defines a back cavity, the supporting plate is disposed at one side of the substrate and defines an accommodation cavity, and the capacitor system is disposed at the supporting plate; the capacitor system comprises a back plate, a fixing component, and a vibrating diaphragm; the back plate is fixed to the supporting plate, the fixing component is fixed to one side of the back plate close to the substrate, the vibrating diaphragm is fixed to one side of the fixing component distal from the back plate and is accommodated in the accommodation cavity; the fixing component is located at a central region of the vibrating diaphragm, and the vibrating diaphragm is disposed opposite to the back plate; the first pad is fixed to one side of the supporting plate distal from the substrate, the first electrode is fixedly connected to the central region of the vibrating diaphragm and is electrically connected to the first pad, and the first electrode is only connected to the central region of the vibrating diaphragm, the vibrating diaphragm defines a first notch extending from an edge of the vibrating diaphragm to the central region of the vibrating diaphragm, the first notch comprises a bottom wall and two side walls, the bottom wall is disposed opposite to an opening of the notch, and the two side walls are respectively connected to two ends of the bottom wall; the first electrode is fixedly connected to the bottom wall, and a gap is defined between the first electrode and the bottom wall, the conductive component penetrates through the back plate, and two ends of the conductive component are respectively and fixedly connected to the first electrode and the first pad;

the conductive component is connected to one end of the first electrode distal from the bottom wall, and the first electrode is electrically connected to the first pad through the conductive component, one side of the back plate distal from the substrate protrudes from a surface of the one side of the supporting plate distal from the substrate; the first pad comprises a main body part, a bent part, and a connecting part; the main body part is fixed to the supporting plate, the bent part is connected to the main body part, and the connecting part is connected to one end of the bent part distal from the main body part; the conductive component penetrates through the connecting part and is fixed to the connecting part.

2. The MEMS microphone according to claim 1, wherein one end of the first electrode distal from the bottom wall is flush with an edge of the vibrating diaphragm.

3. The MEMS microphone according to claim 1, wherein the MEMS microphone further comprises an abutting component, a first end of the abutting component is fixed to the substrate, and a second end of the abutting component abuts against the first electrode; the abutting component is located between the two side walls of the first notch.

4. The MEMS microphone according to claim 3, wherein the MEMS microphone further comprises a first supporting ring, the first supporting ring is embedded and fixed in the accommodation cavity, and two sides of the first supporting ring respectively abut against the vibrating diaphragm and the substrate; the first supporting ring defines a second notch, a projection of the first notch projected on the first supporting ring along a thickness direction of the vibrating diaphragm coincides with the second notch, and the abutting component is located in the second notch.

5. The MEMS microphone according to claim 1, wherein the MEMS microphone further comprises a second supporting ring, the second supporting ring is embedded and fixed in the accommodation cavity, the second supporting ring is located between the vibrating diaphragm and the back plate, and the conductive component penetrates through the second supporting ring.

6. The MEMS microphone according to claim 5, wherein a thickness of the second supporting ring is equal to a thickness of the fixing component.

7. The MEMS microphone according to claim 1, wherein the MEMS microphone further comprises a second pad and a second electrode, the second pad is fixed to the supporting plate, two ends of the second electrode are respectively and fixedly connected to the back plate and the second pad, and the first pad is spaced apart with the second pad.

* * * * *